(12) United States Patent
Bryan

(10) Patent No.: US 7,597,514 B2
(45) Date of Patent: Oct. 6, 2009

(54) AIR VALVE COUPLING METHOD AND APPARATUS

(75) Inventor: Steve M. Bryan, Andrews, IN (US)

(73) Assignee: Bryan Machine Services, Huntington, IN (US)

(*) Notice: Subject to any disclaimer, the term of this patent is extended or adjusted under 35 U.S.C. 154(b) by 44 days.

(21) Appl. No.: 12/038,874

(22) Filed: Feb. 28, 2008

(65) Prior Publication Data

US 2008/0146425 A1 Jun. 19, 2008

Related U.S. Application Data

(62) Division of application No. 11/432,262, filed on May 11, 2006, now Pat. No. 7,360,976.

(60) Provisional application No. 60/680,161, filed on May 12, 2005.

(51) Int. Cl.
*B23C 1/00* (2006.01)

(52) U.S. Cl. .......... 409/131; 409/137; 409/230; 137/15.04; 137/15.06; 137/238; 137/614.05

(58) Field of Classification Search .......... 409/131, 409/132, 137, 135–136, 230, 144; 408/124–125, 408/238, 1 R; 483/13, 901; 451/178, 259, 451/294, 28; 137/614.04, 614.05, 614.06, 137/238, 614, 15.04, 15.05, 15.06; 173/1, 173/3, 218

See application file for complete search history.

(56) References Cited

U.S. PATENT DOCUMENTS

| 3,105,515 | A | | 10/1963 | Keller et al. |
| 3,461,909 | A | | 8/1969 | Vöhringer |
| 4,008,515 | A | | 2/1977 | Hague et al. |
| 4,579,487 | A | | 4/1986 | Lehmkuhl |
| 4,745,674 | A | * | 5/1988 | Abe et al. ............ 483/13 |
| 5,090,849 | A | | 2/1992 | Arai et al. |
| 5,531,279 | A | * | 7/1996 | Biek ............ 173/178 |
| 5,566,770 | A | | 10/1996 | Bowser |
| 5,791,842 | A | | 8/1998 | Sugata |
| 5,944,520 | A | | 8/1999 | Ash |
| 5,984,598 | A | | 11/1999 | Arai et al. |
| 7,214,165 | B2 | * | 5/2007 | Foster et al. ......... 137/15.06 |
| 2004/0146368 | A1 | * | 7/2004 | Konishi ............ 409/131 |

\* cited by examiner

*Primary Examiner*—Erica E Cadugan
(74) *Attorney, Agent, or Firm*—Taylor & Aust, P.C.

(57) ABSTRACT

A method of clearing debris from an air valve of an air driven tool including the steps of contacting a portion of a first valve with a portion of a second valve; sealing the first valve to the second valve; and opening the first valve prior to the sealing step.

8 Claims, 4 Drawing Sheets

AIR VALVE COUPLING METHOD AND APPARATUS

CROSS REFERENCE TO RELATED APPLICATIONS

This is a division of U.S. patent application Ser. No. 11/432,262, entitled "AN AIR VALVE COUPLING METHOD AND APPARATUS", filed May 11, 2006, now U.S. Pat. No. 7,360,976 which claims benefit to U.S. provisional patent application Ser. No. 60/680,161, entitled "AIR TURBINE COUPLER", filed May 12, 2005, which is incorporated herein by reference.

BACKGROUND OF THE INVENTION

1. Field of the Invention

The present invention relates to the coupling of an air valve assembly, and, more particularly, to coupling an air valve assembly of a machining center.

2. Description of the Related Art

It is known to provide a spindle unit for a machine tool in which the tool holding end of the spindle has a tapered socket in its nose to receive and hold a tool holder provided with an adapter. The adapter may be engaged with finger hooks carried by a drawbar so that the finger hooks are engaged and the drawbar is pulled inwardly by a spring mechanism of the tool holder to hold the tool. To release the tool holder for removal from the spindle it is often necessary to reverse the operation and push the drawbar inwardly a substantial distance against the force of the spring.

Tool changing centers use adapters to provide a uniform mounting mechanism to the spindle of a machining center so that individual tools may be mounted in the adapters for automatic insertion into the machine center spindle.

It is also known to provide air turbines that connect to an air delivery system of the machining center to provide a high-speed rotation of a cutting tool, which may exceed the speed available from the spindle that is mechanically driven.

A problem with the air coupling devices is that it is difficult to keep them clean and to ensure that no debris enters the air turbine.

What is needed in the art is a simple cost effective way of removing debris from the coupling devices of an air valve.

SUMMARY OF THE INVENTION

The present invention clears the sealing surfaces of two air valves prior to their coupling.

The invention comprises, in one form thereof, a machining center including a machining head, a tool changer, an air driven tool and an air valve system. The air driven tool is connectable to the machine head by action of the tool changer. The air valve system has a first portion associated with the machining head and a second portion associated with the air driven tool. The first portion and the second portion include a connection therebetween having an airflow across the connection before the connection seals.

An advantage of the present invention is that the flow of air is utilized to clean the valve prior to an engaging into a sealed relationship.

Another advantage of the present invention is that one valve assembly is extended by the removal of an opposing air pressure.

Another advantage of the present invention is that air is utilized to extend a portion of one valve assembly.

BRIEF DESCRIPTION OF THE DRAWINGS

The above-mentioned and other features and advantages of this invention, and the manner of attaining them, will become more apparent and the invention will be better understood by reference to the following description of an embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
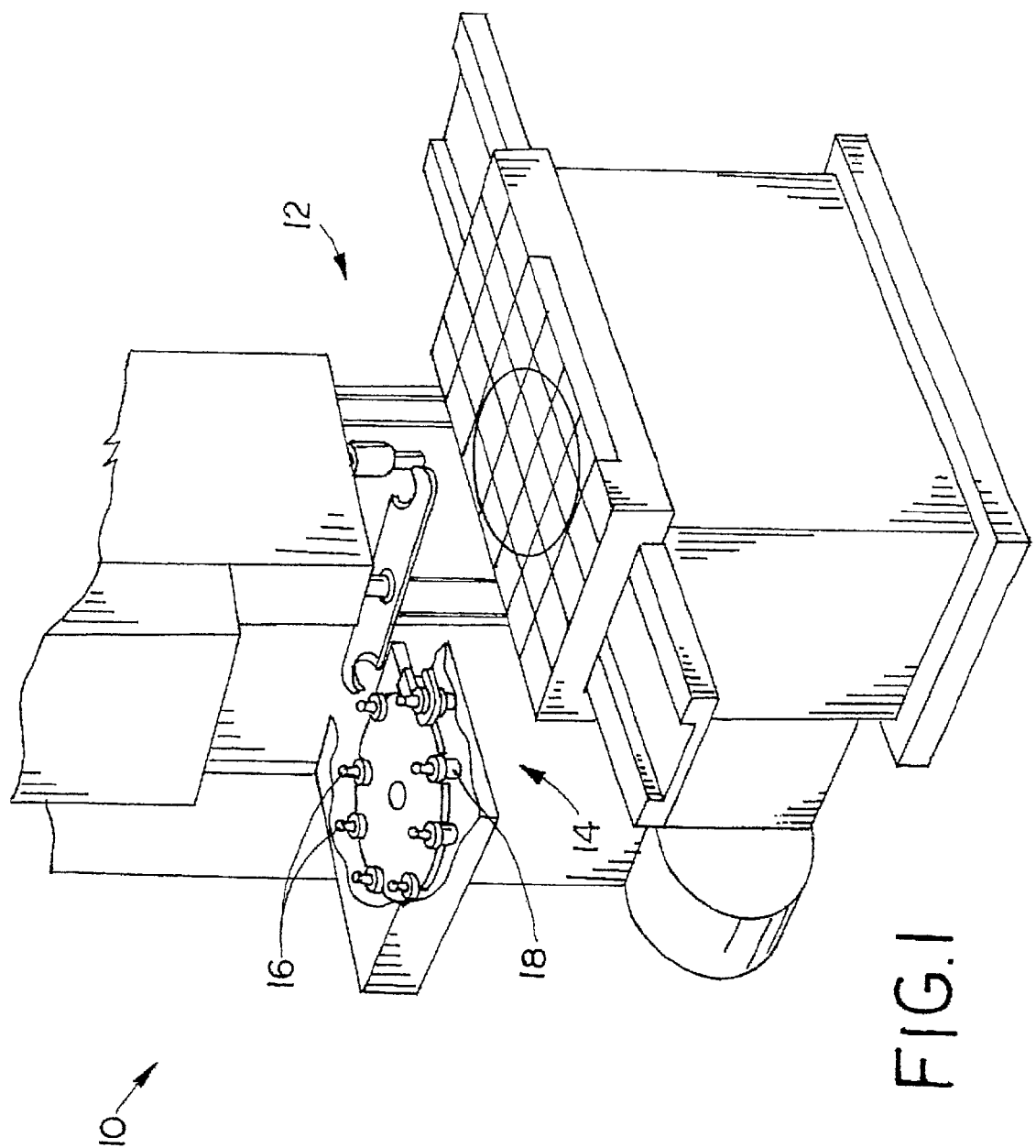
FIG. 1 is a perspective view of a machining center utilizing an embodiment of an air-coupling valve of the present invention.

Referring now to the drawings, and more particularly to FIG. 1, there is shown a machining center 10 having a machining head 12, a tool changer 14, tools 16 and an air driven tool 18. Machining center 10 is under programmable control of a controller, not shown, that operates the relative position of an X-Y table, the spindle operation is in a Z direction. The spindle of machine head 12 receives tools 16 and 18, which are shaped to a uniform adaptive feature so that they can be readily inserted into the spindle of machine head 12. Tool changer 14 removes tools from the spindle and picks up tools 16 or 18 from a tool storage device. Air driven tool 18 is substantially similar to tool 16 except that air driven tool 18 has a valve system attached thereto. Machining center 10 is programmed to locate a cutting edge of a tool 16 or 18 in an appropriate position for cutting material mounted on the X-Y table.

Figure 2:
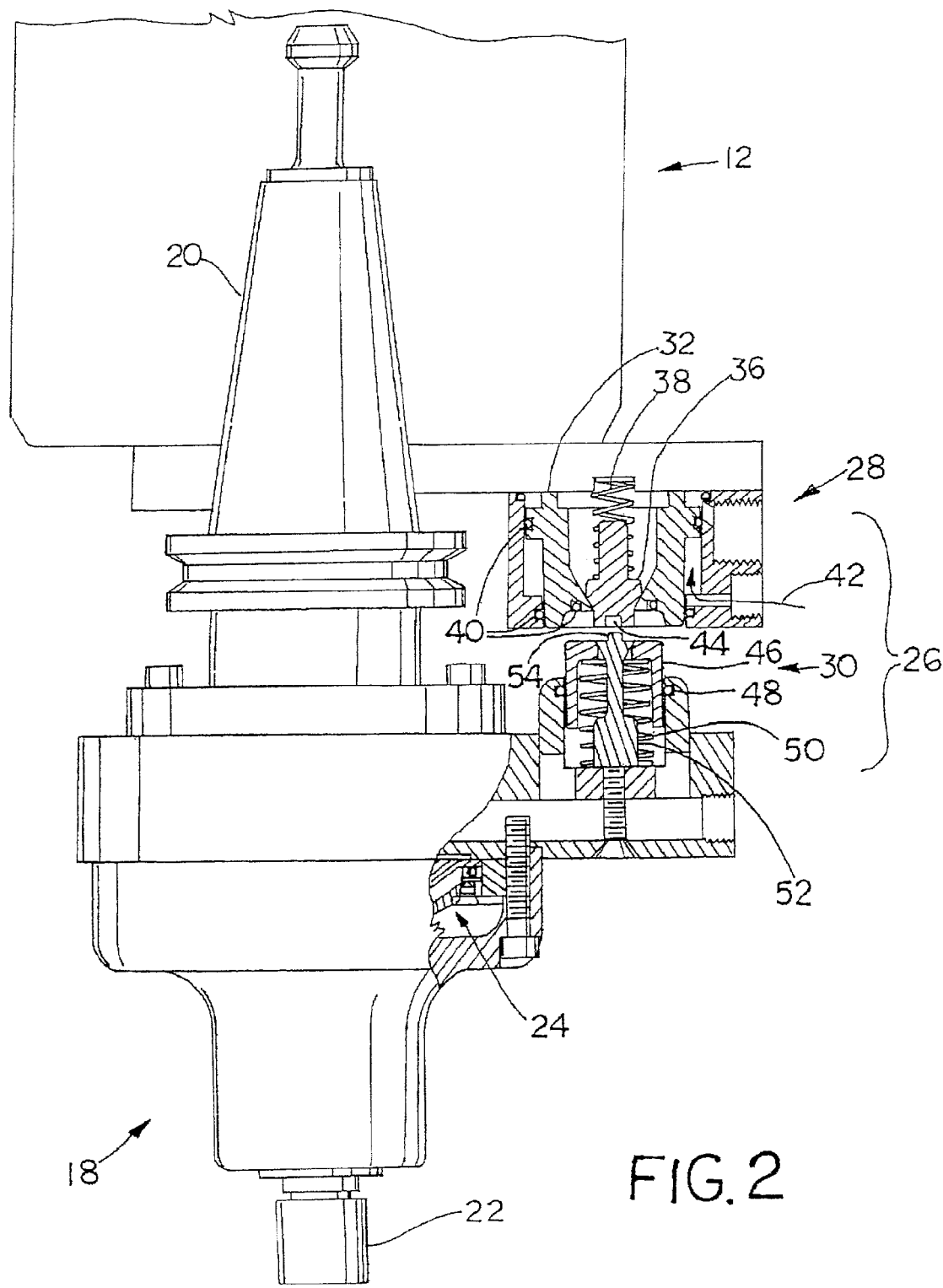
FIG. 2 is a partially cross-sectioned view of an embodiment of an air-coupling valve of the present invention used in the machining center of FIG. 1.
Figure 3:
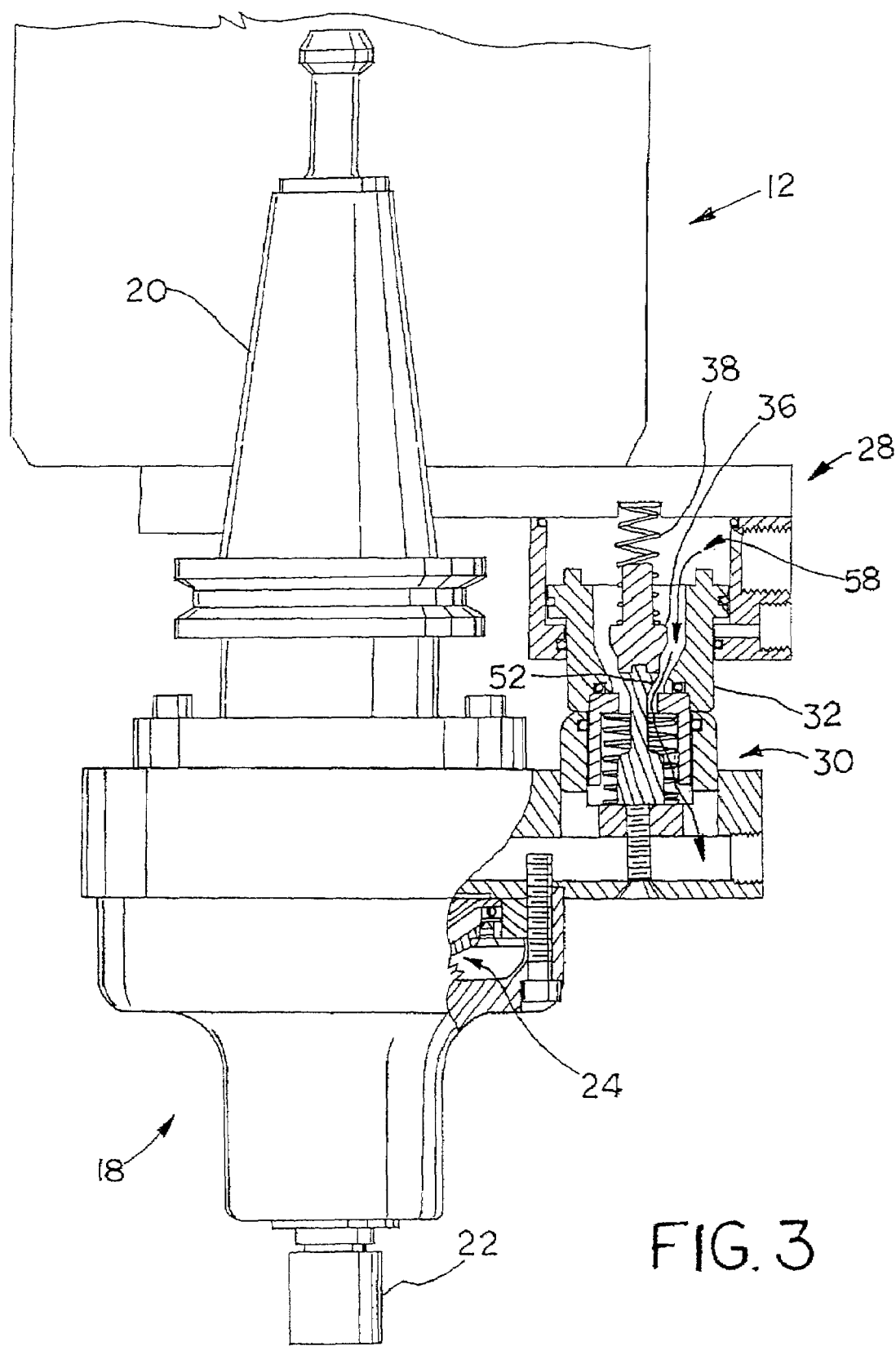
FIG. 3 is another view of the air coupling valve of FIG. 2 showing an air flow being supplied to the air turbine.
Figure 4:
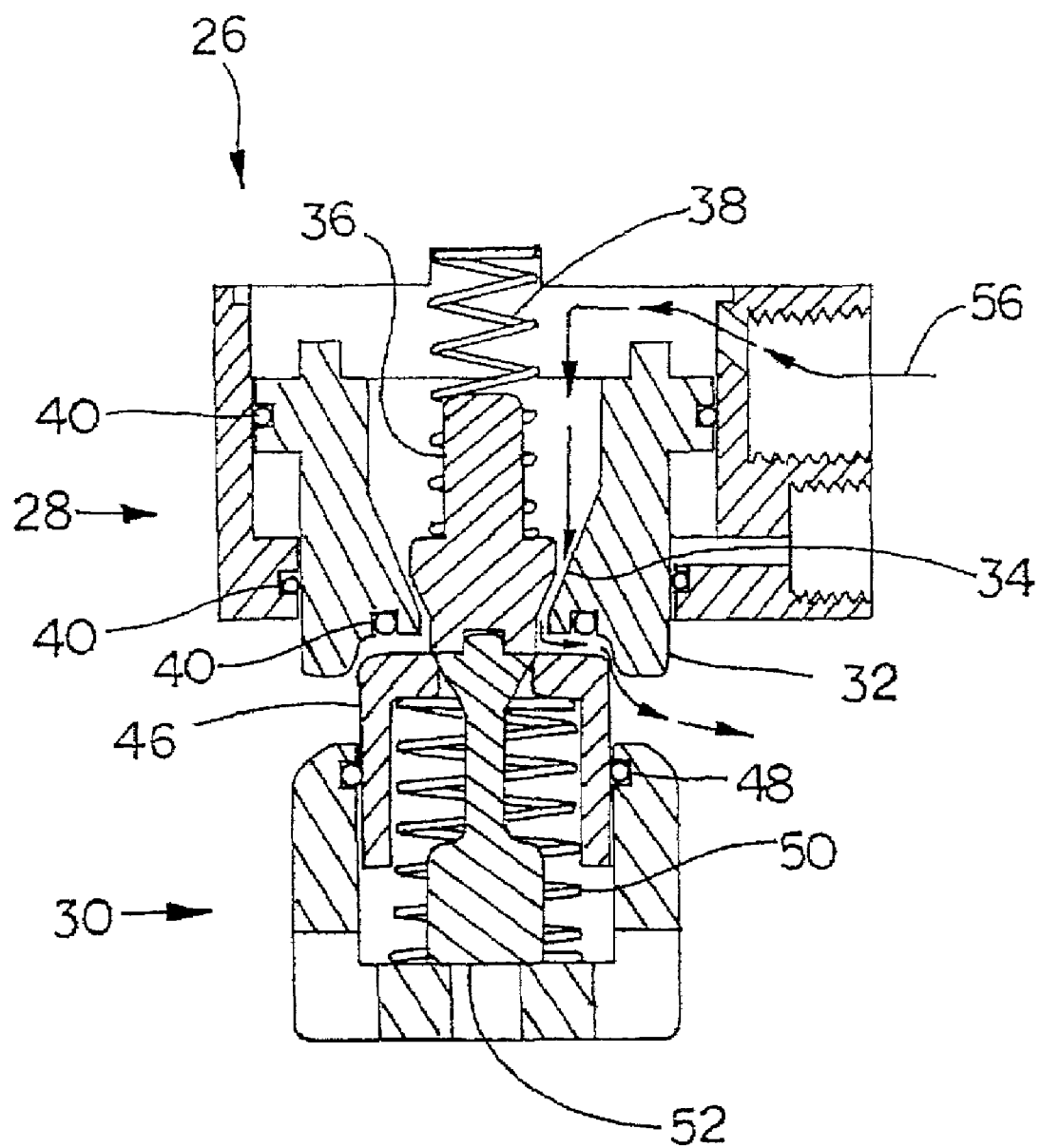
FIG. 4 is a close-up view of the air-coupling valve of FIGS. 2 and 3 as it clears any debris therefrom.

Now, additionally referring to FIGS. 2-4 air driven tool 18 includes a coupling spindle 20, a chuck 22, an air turbine 24 and part of a valve system 26. Coupling spindle 20 is a standard shape to fit the spindle of machine head 12. A chucking device 22 is provided to mount cutting tools thereto. Valve system 26 includes a first portion 28 and a second portion 30. First portion 28 is generally related to machine head 12 while second portion 30 is connected to air driven tool 18. First portion 28 and second portion 30 can individually be considered valves 28 and 30 since each serve to close airflow openings when air driven tool 18 is not in position with machine head 12.

First valve 28 includes an extendable cup 32, a seat 34, a sealing post 36, a spring 38 and O-rings 40. Extendable cup 32 has O-rings 40 along the side and along a sealing surface to contain air pressure and also provide a bearing surface for the movement of extendable cup 32. An air flow 42 serves as a retracting air flow 42 to hold extendable cup 32 in a retracted position, as shown in FIG. 2. Retracting airflow 42 works against the biasing force of spring 38 in holding extendable cup 32 in the retracted position. Seat 34 contacts a portion of sealing post 36 due to the biasing effect of spring 38. This prevents the flow of air between sealing post 38 and seat 34. Sealing post 36 has a centering feature 44 that interacts with a portion of second valve 30 to keep sealing post 36 centered as it is moved away from seat 34.

Second valve 30 includes a biased cup 46, O-rings 48, a spring 50 and a sealing post 52 having a centering feature 54. Second valve 30 remains sealed as long as the biasing force from spring 50 keeps cup 46 in position against a beveled surface of sealing post 52. O-ring 48 provides a sealing and bearing surface for the movement of biased cup 46 when extendable cup 32 encounters it.

As can be seen in FIG. 3 when retracting air flow 42 is removed and air pressure is provided to the back side of extendable cup 32, cup 32 engages biased cup 46 allowing an air flow 58 to pass from an air source to an air plenum that is directed to air turbine 24. The controller of machining center 10 includes air control valves that can remove the supply of air flow 58 and can supply a retracting air flow 42 to thereby disengage first valve 28 from second valve 30.

Prior to full engagement of valve system 26, sealing post 36 contacts sealing post 52 allowing a cleansing air flow 56 to move across the sealing surface between an o-ring 40 and an outer surface of biased cup 46. Although airflow 56 is schematically shown on one side, for the sake of clarity, it can easily be understood that the airflow is uniformly distributed around the sealing surface of cups 32 and 46. This is assisted by centering features 44 and 54 respectively of sealing posts 36 and 52, which keeps sealing post 36 centered in the opening of cup 32. Airflow 56 advantageously removes debris that may be present on the surfaces of cups 32 and 46 prior to their full engagement as shown in FIG. 3. The rapidity of the encounter between cups 32 and 46 can be controlled by the amount of air pressure being supplied by way of air flow 56 and by additional springs along the sides of extendable cup 32, which are not shown. Air pressure supplied to the back side of extendable cup 32 causes it to fully engage biased cup 46 by driving spring 50 into a more compressed state and allowing air to pass by way of air flow 58 to air turbine 24.

Reversing the steps, when it is time to disengage air driven tool 18 from machine head 12, includes removing air flow 58 and supplying retracting air flow 42 to cause extendable cup 32 to retract to the position as shown in FIG. 2. When first valve 28 is fully retracted tool changer 14 may engage air driven tool 18 and remove it from machine head 12. The actual control sequences of the machining tool language are known and are not discussed herein.

Advantageously, the present invention allows for an automatic coupling that pre-cleans the sealing surface by a short burst of air prior to engaging and opening both valves. Positive airflow is ensured since the airflow must be present to cause the movement of the extendable cup. Another advantage of the present invention is that both valves automatically seal for the removal of the tool from the machine head.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of clearing debris from an air valve system of an air driven tool, comprising the steps of:
    contacting a portion of a first valve with a portion of a second valve;
    sealing said first valve to said second valve; and
    opening said first valve prior to said sealing step and during said contacting step.

2. The method of claim 1, wherein said opening step causes air to blow over a sealing area between said first valve and said second valve.

3. The method of claim 2, wherein said first valve includes an extendable cup having an opening therein.

4. The method of claim 3, wherein said portion of said first valve is in the form of a sealing post located in said opening, said sealing post being biased to seal said opening.

5. The method of claim 3, further comprising the step of holding said extendable cup in a retracted position with a biasing force.

6. The method of claim 5, further comprising the step of holding said first valve in a retracted position by way of the biasing force in the form of pressurized air.

7. The method of claim 6, further comprising the step of removing said pressurized air and providing pressurized air in an opposite direction, thereby causing said portion of said first valve to extend to engage said portion of said second valve for said sealing step.

8. The method of claim 1, wherein the air driven tool is a machining tool.

* * * * *